United States Patent [19]

Komatsu et al.

[11] 4,123,015
[45] Oct. 31, 1978

[54] AUTOMATIC STOPPING DEVICE FOR TAPE RECORDER

[75] Inventors: Fumito Komatsu, Suwa; Shinkichi Yazima, Chino, both of Japan

[73] Assignee: Kabushiki Kaisha Sankyo Seiki Seisakusho, Japan

[21] Appl. No.: 866,950

[22] Filed: Jan. 5, 1978

[30] Foreign Application Priority Data

Jan. 20, 1977 [JP] Japan .................................. 52-5627
Jan. 20, 1977 [JP] Japan .................................. 52-5628

[51] Int. Cl.² ........................ B65H 59/38; G03B 1/02
[52] U.S. Cl. ...................................... 242/191; 226/11; 360/74
[58] Field of Search ................ 242/186, 191, 201–204; 360/71, 74; 226/11, 174

[56] References Cited

U.S. PATENT DOCUMENTS

| 3,582,013 | 6/1971 | Beretta | 242/186 |
| 3,946,966 | 3/1976 | Komatsu et al. | 242/191 |
| 3,971,528 | 7/1976 | Komatsu et al. | 242/191 |
| 4,033,491 | 7/1977 | Aldenhoven | 226/11 |

Primary Examiner—Leonard D. Christian
Attorney, Agent, or Firm—McGlew and Tuttle

[57] ABSTRACT

A flywheel is provided with a detection wheel which is rotatable relative to the flywheel, and is also provided with a displacement member which is rotatable with the flywheel and is radially movable thereto. The detection wheel forms part of a drive system for a reel mount, and ceases its movement upon termination of tape rewind. The displacement member is provided with a pin which actuates a release lever to stop the operation of a tape recorder when the member moves radially in response to the detection wheel coming to a stop.

3 Claims, 17 Drawing Figures

AUTOMATIC STOPPING DEVICE FOR TAPE RECORDER

BACKGROUND OF THE INVENTION

The invention relates to an automatic stopping device for a tape recorder, movie camera or similar instrument which can be used to stop the operation of the instrument automatically upon completion of a take-up operation of a tape or a film.

An automatic stopping device for tape recorder or the like is known which is integrally assembled into and operated by the inertia of a flywheel, which represents an essential part of a rotating system. By way of example, Japanese Patent Application No. 3801/1975 discloses such device which comprises a pair of ring-shaped magnets, spring anchoring ring, detection wheel, coiled spring, release ring and roller, all received in a recess formed in a flywheel and covered with a top cover. These components are arranged such that the release ring is disposed for vertical movement within the recess and is provided with a kicker which is disposed to project out of or into the top cover so that the release lever can be actuated to achieve an automatic stop when the kicker projects axially of a capstan shaft. This requires a sufficient stroke for the vertical movement of the release ring to the kicker, but the stroke is limited in order to prevent an increased height of the flywheel. A limited stroke requires an increased accuracy in the machining of the release lever. In addition, the axial movement alone is insufficient, and must be accompanied by a movement in the peripheral direction, resulting in an increased number of parts to satisfy the requirements and in a complex arrangement.

SUMMARY OF THE INVENTION

It is an object of the invention to provide an automatic stopping device for tape recorder in which the release lever of a tape recorder is made to be actuated by a pin which moves in the radial direction, thus allowing an increased axial dimension of the flywheel to be avoided and achieving a sufficient stroke for the movement of the pin with a simple arrangement and without requiring an increased accuracy on the parts used.

In accordance with the invention, the automatic stopping device for tape recorder comprises a flywheel, a detection wheel disposed in overlying relationship with the flywheel and disposed for engagement with a tape feed member such as a reel mount or an idler connected therewith, a slide control member urged for rotation in one direction by a spring having its one end connected with the flywheel and having a sliding wall, a displacement member disposed for movement along the sliding wall of the control member and including a pin adapted to bear against a release lever and a guide, and a base plate having a guide aperture for receiving the pin is fitting relationship to control a range of movement of the displacement member and also having a guide pin which extends inwardly adjacent the guide of the displacement member for controlling the movement of the displacement member in a radial direction. When the detection wheel moves angularly relative to the flywheel in response to a load that occurs in response to the tape feed member coming to a stop, the pin on the displacement member is moved in the peripheral direction and driven into a circular path of a greater diameter along which it is capable of engaging the release lever, thus operating the latter.

In accordance with the invention, the pin is driven outward by utilizing the torque which is stored in the spring as the detecting wheel comes to a stop, so that the speed of response is increased, assuring a proper operation. The height of the entire flywheel assembly which incorporates the automatic stopping mechanism can be reduced, and since the pin moves through a single plane, the pin may have an increased height, whereby the accuracy of the release lever may be reduced without the fear of causing its disengagement from the pin. The simplified construction avoids a high accuracy of the parts. As compared with the prior arrangement in which the pin moves in the vertical direction, the use of certain parts such as magnets or spring is avoided, thus substantially decreasing the number of parts. In this manner, the cost required for the parts and their assembly is reduced.

DETAILED DESCRIPTION OF PREFERRED EMBODIMENTS

Figure 1:
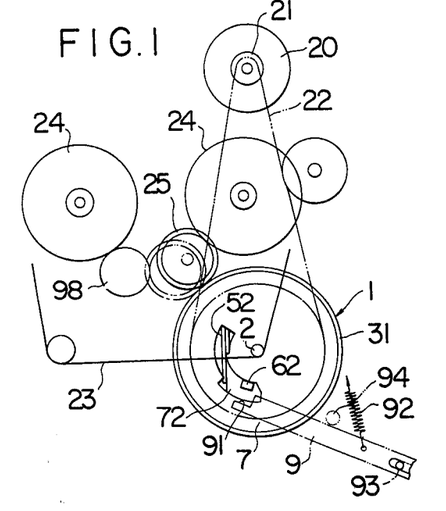
FIG. 1 is a schematic plan view of a tape recorder incorporating the device of the invention.

Referring to FIG. 1, there is shown a flywheel 1 which is adapted to be driven for rotation by a motor 20 through a pulley 21 thereon and a belt 22. The flywheel 1 carries a capstan shaft 2, which cooperates with a pinch roller, not shown, to feed a tape 23 at uniform rate. It is to be understood that a pair of reel mounts 24 on which a supply reel and a take-up reel for the tape 23 are mounted are adapted to be driven in either clockwise or counterclockwise direction by a separate power system, not shown, or by the flywheel 1 through idler. In the description to follow, it is assumed that the opposite ends of the tape 23 are anchored to the pair of reels.

Figure 2:
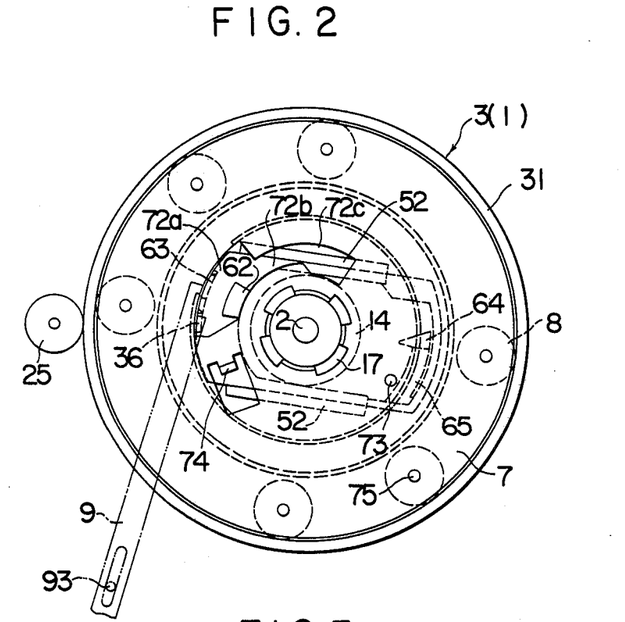
FIG. 2 is a plan view of one embodiment of the invention.
Figure 3:
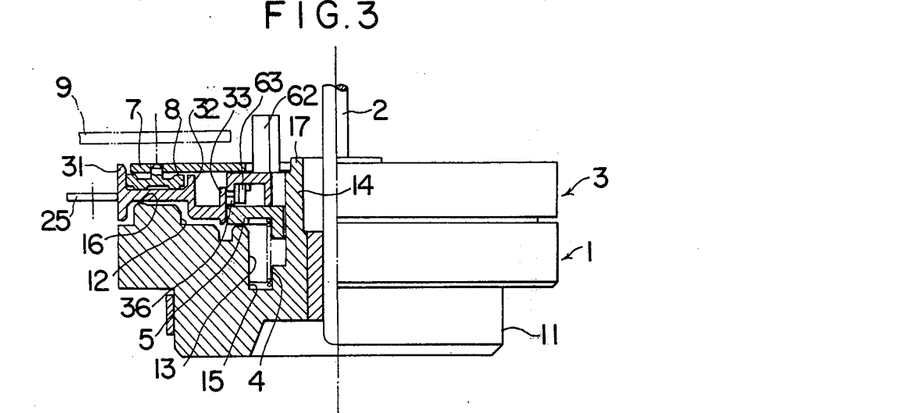
FIG. 3 is a front view partially in cross section, of the embodiment of FIG. 2.
Figure 4:
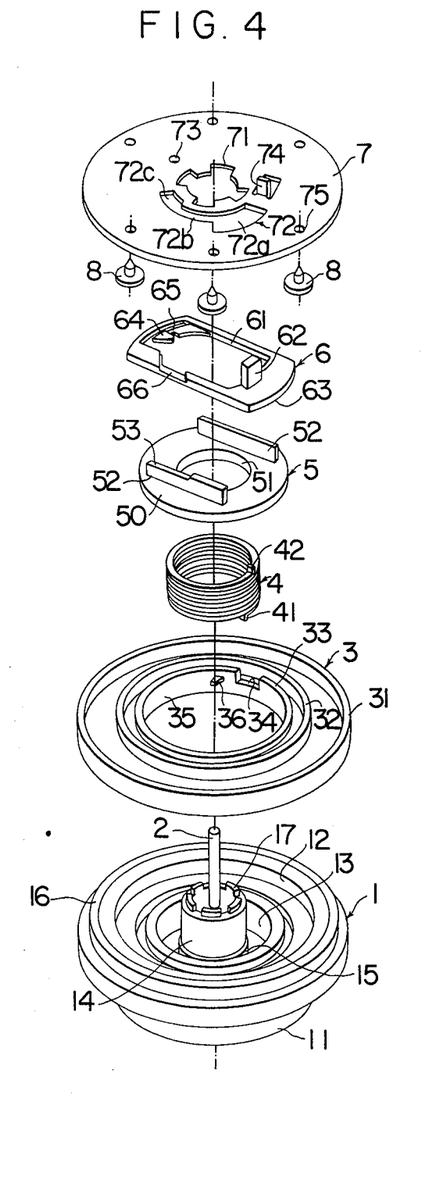
FIG. 4 is an explodedd, perspective view of the embodiment shown in FIG. 2.

The flywheel 1 is formed of a metal material such as iron having a relatively high specific gravity, and as shown in FIGS. 2 to 4, comprises an outer pulley 11 engaged by the belt 22, a recess 12 of a larger diameter, another recess 13 of a smaller diameter, and a central boss 14. The bottom of the smaller recess 13 is formed with a hole into which is inserted the folded lower end 41 of a coiled spring 4. The outer boundary of the larger recess 12 is defined by an annular rib 16. A doughnut-shaped slide control member 5 is placed above the spring 4, and is formed with a central bore 51, which is loosely fitted over the boss 14 of the flywheel 1. The upper face of the spring 4 bears against the lower surface of the slide control member 5, and the folded upper end 42 of the spring 4 is engaged with a hole formed in the control member 5 at a suitable location.

A detection wheel 3 is placed on top of the flywheel 1, and is generally doughnut-shaped in configuration. Specifically, it comprises an integral assembly of an outer, an intermediate and an inner wheel 31, 32, 33, with the outer and the intermediate wheel 31, 32 being connected together at a level intermediate their height and the intermediate and the inner wheel 32, 33 being connected together at a level adjacent their bottom. The outer wheel 31 is peripherally knurled to prevent a slippage when an idler 25 is brought into engagement therewith. The inner wheel 33 is formed with an upwardly opening notch 34 and with a tab 36 which extends inwardly from the inner peripheral surface 35 thereof adjacent the notch 34.

The detection wheel 3 is placed on the flywheel 1 such that the slide control member 5 is fitted inside the inner peripheral surface 35 of the inner wheel 33. The slide control member 5 comprises a doughnut-shaped disc 50 with a pair of sliding walls 52 formed on the upper surface thereof, and is urged for rotation in a given direction by the spring 4. A notch 53 is formed in the upper surface of one of the sliding walls 52.

A displacement member 6 is placed on top of the slide control member 5. The displacement member 6 is in the form of an annulus which is centrally formed with an elliptical bore 61 having a radius slightly greater than the radius of the boss 14 of the flywheel 1. The elliptical bore 61 is fitted over the boss 14 while the entire member 6 is disposed between the pair of sliding walls 52 of the slide control member 5 so as to be slidable in the lengthwise direction. At its one end, the displacement member 6 fixedly carries a pin 62 on its upper surface, and the adjacent end is provided with a downwardly depending detent piece 63, which may be disposed in the space defined by the intermediate and the inner wheel 32, 33 or in a recess defined by the inner peripheral surface 35 of the inner wheel of the detection wheel 3. At its other end, the displacement member 6 is formed with a triangular guide projection 64 which is resiliently supported by a resilient arm 65. The displacement member 6 is also formed with a notch 66 in alignment with the notch 53 formed in one of the sliding walls 52.

Disposed on top of the displacement member 6 is a base plate 7 having an opening 71 formed centrally therein, through which the capstan shaft 2 extends and into which a plurality of projections 17 fixedly mounted on the upper end face of the boss 14 are fitted and secured, thus rendering the base plate 7 integrally rotatable with the flywheel 1. Formed in the base plate radially outward of the central opening 71 is a guide slot 72 into which the pin 62 fixedly mounted on the displacement member 6 extends and which controls the movement of the pin 62. The guide slot 72 has a wider portion 72a, which is contiguous with a slot portion 72b of a reduced width, which is in turn contiguous with another slot portion 72c of an intermediate width, these slot portions forming together a semi-circular slot. A guide pin 73 depends downwardly from the base plate 7 at a position which is substantially diametrically opposite to the slot portion 72a, and is located adjacent the edge of the resilient arm 65 of the displacement member 6. A piece 74 is punched from the base plate 7 adjacent the wide slot portion 72a. To achieve a smooth rotation of the detection wheel 3, it is placed on the rib 16 and is supported by a plurality of rollers 8 pivotally mounted in smaller apertures 75 formed in the base plate 7 and engaging with the inner surface of the outer wheel 31.

As shown in FIG. 1, a release lever 9 associated with a pushbutton unit is urged clockwise against a stop pin 94 by means of a coiled spring 92, and the lever 9 is lengthwise slidably supported by a pin 93. As the pin 62 moves radially outward, it engages a step 91 formed in the lever 9, thereby actuating the latter.

The idler 25 is disposed for engagement with the outer peripheral surface of the detection wheel 3, and is effective to transmit the rotation of the detection wheel 3 to the reel mount 24 or to transmit the rotation of the detection wheels 3 to the outer reel mount 24 through another idler 98, thus driving either one of the reel mounts 24 at a higher rate to achieve a rapid tape advance or a tape rewind operation.

Figures 5, 6, 7:
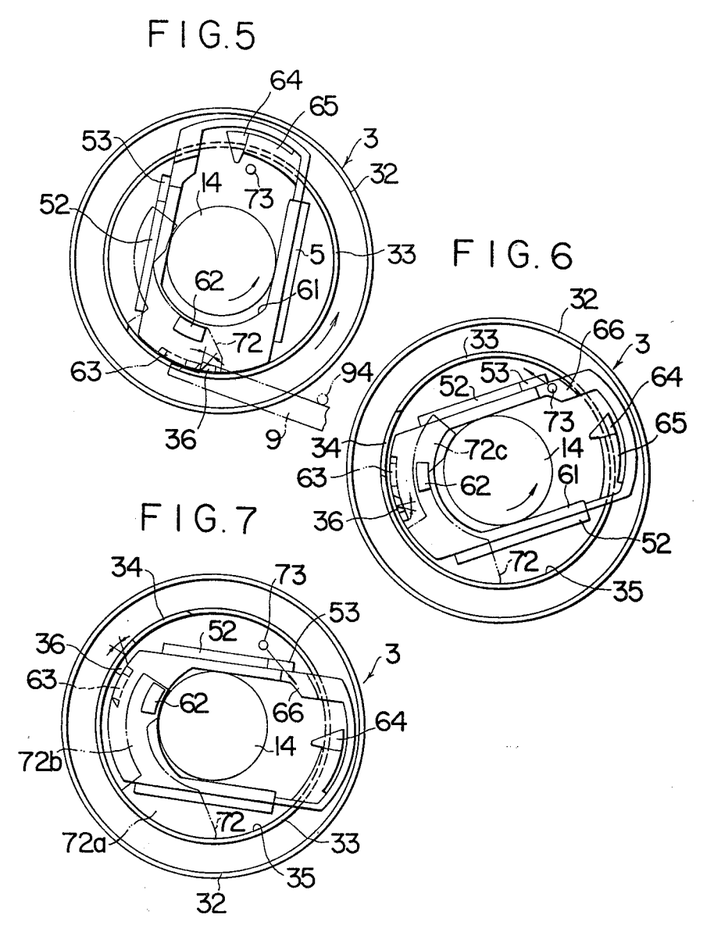
FIGS. 5 to 12 are fragmentary plan views of the embodiment in different phases of operation.

The operation of the automatic stopping device will now be described with reference to FIGS. 5 to 12 which illustrate the various components in different phases of operation. It is to be noted that in these Figures, the positions of various members are depicted as referenced to the flywheel which is shown as stationary even though it continues to rotate at a uniform rate. In addition, the outer wheel of the flywheel and the detection wheel is omitted from illustration for the clarity of the drawings. Assume that a record/playback mode is established. In this instance, the idler 25 engages neither the detection wheel 3 nor reel mount 24 nor idler 98, but the reel mount 24 associated with the takep-up reel is driven for rotation by a separate drive system, not shown, whereby the tape is coiled around the take-up reel by the cooperation of the pinch roller, not shown, and the capstan 2 which rotates at a uniform rate. In this mode, there is no load on the detection wheel 3, so that all of the members and components which are concentrically disposed on the flywheel rotate counterclockwise in an integral manner, as shown in FIG. 5. The spring 4 is initially charged to cause the slide control member 5 and hence the displacement member 6 to rotate counterclockwise relative to the flywheel 1, but the pin 62 on the displacement member 6 bears against the bevelled edge adjacent the forward end of the guide slot 72, as viewed in the direction of rotation, assuming a position most close to the axis thereof under the condition shown in FIG. 5. When the flywheel assembly is completely assembled, the displacement member 6 is disposed so that the detent piece 63 bears against the peripheral surface 35, and this combined with the location of the pin 62 prevents rotation of the displacement member 6 and the slide control member 5 relative to the flywheel 1.

It is to be understood that the actuation of the release lever at the tape end is performed only during a rapid tape advance and a tape rewind mode with this embodiment although it can be achieved also during a record/playback mode with another embodiment to be described later. When the record/playback mode is manually reset and the drive is switched to a rapid tape advance mode, the idler 25 is brought into abutment against both the detection wheel 3 and the right-hand reel mount 24, as shown in solid line in FIG. 1. In this mode, the flywheel and the various members disposed concentrically thereon still continue to rotate counterclockwise, as viewed in FIG. 5, but the load on the reel mount 24 is transmitted through the idler 25 to the detection wheel 3, which therefore tends to remain stationary. The slide control member 5 and the displacement member 6 tend to rotate as the flywheel rotates since the detent piece 63 bears against the flywheel and its integral base plate 7, but when the tab 36 on the detection wheel abuts against the detent piece 63 on the displacement member 6, the slide control member 5 and the displacement member 6 also tend to remain stationary together with the detection wheel 3. Since the flywheel continues to rotate while these members remain stationary, the spring 4 is charged in the meantime until the pin 62 on the displacement member 6 has moved to the rear end of the slot portion 72b having a reduced width where the resilience of the spring 4 is balanced with the load imparted to the detection wheel 3 from the reel mount 24, whereupon the rotation of the flywheel 1 is transmitted through the detection wheel 3 and idler 25 to the reel mount 24, causing the latter to rotate at a higher rate to achieve a rapid tape advance. In the condition shown in FIG. 6, the guide pin 73 fixedly mounted on the base plate 7 is located within the notch 66 formed in the displacement member 6.

Figures 8, 9:
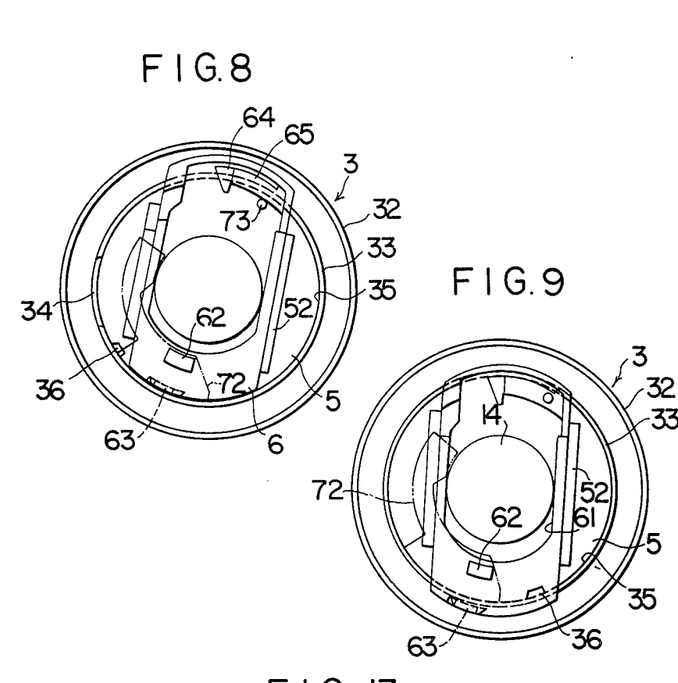
Figures 10, 11, 12:
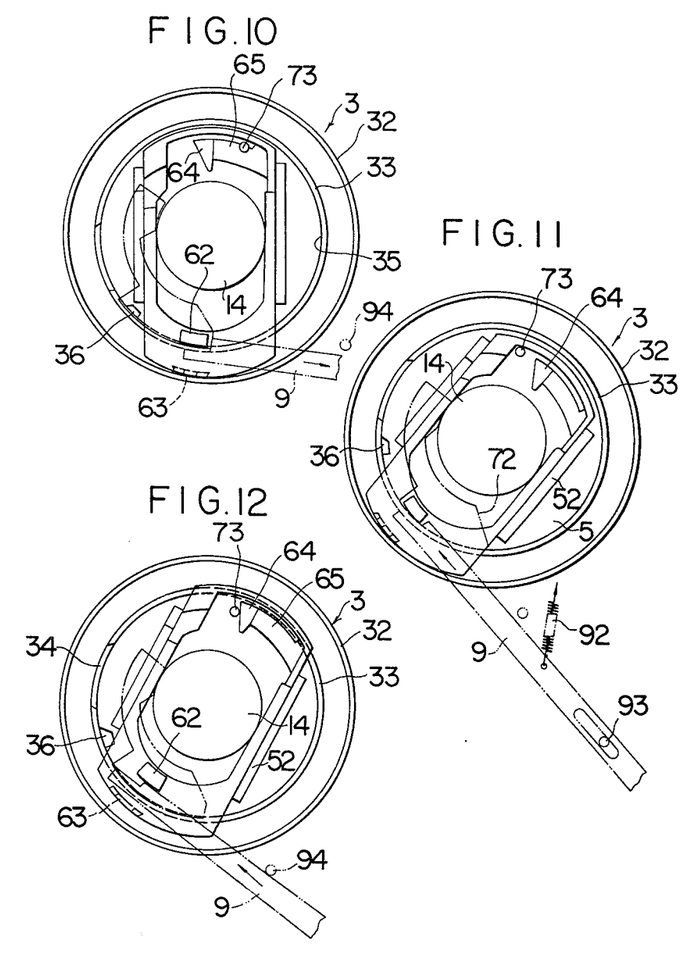

Subsequently when the tape 23 is entirely coiled around the take-up reel and its terminal end is reached to interrupt the tape running, the tension in the tape applies a braking action on the reel mount 24, which therefore ceases to rotate, applying a braking action through idler 25 to the detection wheel 3 to stop its rotation. When the detection wheel 3 ceases to rotate, the continued rotation of the flywheel 1 causes the base plate 7 to rotate, so that the guide slot 72 moves. However, since the detent piece 63 of the displacement member 6 bears against the inner peripheral surface 35 of the inner wheel 33, the member 6 remains stationary at such position. On the other hand, the pin 62 moves from the slot portion 72b to the intermediate width portion 72c, and the detent piece 63 moves into abutment against the tab 36 projecting from the inner peripheral surface 35 and rides up the bevelled surface thereof to retract the displacement member 6, whereby the pin 62 drops into the slot portion 72c, as shown in FIG. 7. In the meantime, the spring 4 having its ends 41, 42 anchored with the flywheel 1 and the slide control member 5 is charged to store torque. Subsequently, when the continued rotation of the flywheel 1 causes a rotation of the displacement member 6 relative to the detection wheel 3 to disengage the detent piece 63 from the tab 36, the pin 62 is urged by the torque of the spring 4 into a position where it bears against the front edge of the guide slot 72, as shown in FIG. 8. Subsequently as the displacement member 6 rotates to bring the detent piece 63 in the region of the notch 34 formed in the wheel 33, the detent piece 63 projects out of the inner wheel 33 through the notch 34, and a corresponding movement of the displacement member 6 causes the pin 62 to move in the centrifugal direction along the wall of the guide slot 72 until the detent piece 63 bears against the intermediate wheel 32 shown in FIG. 10 after passing through the intermediate condition shown in FIG. 9. At this time, the pin 73 on the base plate 7 is located on the outer peripheral edge of the resilient arm 65. When the pin 62 has moved in the manner mentioned above, the displacement member 6 rotates with the flywheel and the notch 91 of the release lever 9 associated with the pushbutton unit is located on the path of rotation of the pin 62, so that the pin 62 engages the notch of the lever. As the flywheel further continues to rotate, the abutment of the pin 62 against the lever 9 causes a backward relative movement of the displacement member 6 until the pin 62 bears against the step at the end of the wider slot portion 72a. In the meantime, the pin 73 on the base plate 7 moves under the outer peripheral surface of the resilient arm 65 while causing flexure thereof and moves forwardly of the front end of the guide projection 64 while being guided by the resilient arm 65. Since the pin 62 is forcedly rotated in the counter-clockwise direction by the step in the guide slot 72, the release lever 9 is urged lengthwise to release a locked rapid advance mode of the pushbutton unit, and thus interrupting a rapid tape advance operation.

As the various members rotate under the influence of the inertia of the flywheel after the pushbutton unit is reset, the restoring force of the lever 9 which results from the resilience of the return spring 92 acts on the pin 62 in the radial direction, urging it toward the center of rotation. Since the pin 62 is no longer blocked from rotation by the lever 9, the displacement member 6 rotates with the slide control member 5 relative to the flywheel under the influence of the stored resilience of the spring 4 (see FIG. 12). The resulting rotation of the displacement member 6 causes the bevelled edge of the guide tab 64 to bear against the pin 73, moving the displacement member 6 forwardly. The forward movement of the displacement member 6 is blocked by the abutment of its detent piece 63 against the inner wheel 33, whereupon the operation of various members is stopped. When a rapid advance operation is repeated again, the detection wheel 3 is almost freely rotatable relative to the wheel 1 and the displacement member 6 while a load from the reel mount 24 is applied to the detection wheel 3 to cause a relative rotation of the displacement member 6 with respect to the detection wheel 3, and when the detent piece 63 is located in the notch 34 formed in the inner wheel 33, the displacement member 6 experiences a further relative rotation under the influence of the spring 4 and the pin 62 return to its original position shown in FIG. 5.

The described automatic stopping operation occurs in a similar manner during a tape rewind mode. Specifically, during a tape rewind mode, the idler 25 is interposed between the detection wheel 3 and the idler 98 as shown in phantom line in FIG. 1, driving the left-hand reel mount 24 for clockwise rotation. In other respects, the automatic stopping device operates in a similar manner as mentioned above.

Figure 13:
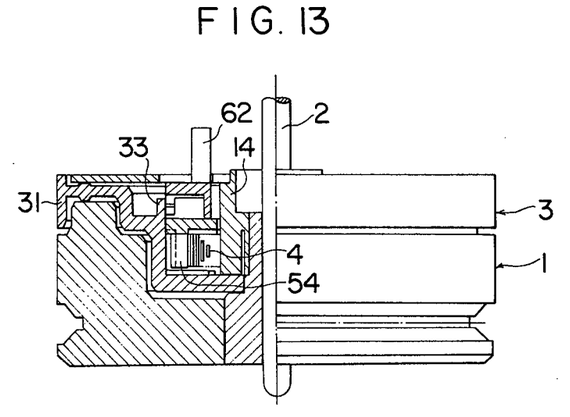
FIG. 13 is a front view, partly in section, of another embodiment of the invention.

FIG. 13 shows another embodiment of the invention, which is similar to the previous embodiment except that the roller 8 is omitted and the spring 4 comprises a spiral spring formed of a leaf spring material and having its one end anchored to a spring abutment 54 which depends downwardly from the lower surface of the slide control member 5 and its other end anchored to the boss 14 of the flywheel 1. This embodiment operates in the similar manner as the previous embodiment, and therefore will not be described.

In the foregoing description, the automatic stopping operation during a rapid advance and a rewind mode has been dealt with. However, by utilizing the punched piece 74 formed in the base plate 7 of the previous embodiments, an automatic stopping operation during a record/playback mode is also possible. Specifically, another release lever which substantially conforms to the release lever 9 may be disposed in overlying relationship therewith for cooperation with a tape end detecting member which is responsive to a change in the tape tension, for example, so that said another release lever may be moved onto the path of rotation of the punch piece 74 in response to the actuation of the tape end detecting member. This enables the release lever to be driven by the punch piece 74 to unlock the pushbutton unit which established the record/playback mode, thus interrupting a rapid tape advance operation.

While it is possible to achieve an automatic stopping operation during record/playback mode with the embodiments shown in FIGS. 1 to 13, a reliable automatic stopping operation can be performed during record/playback mode with an embodiment as shown in FIGS. 14 to 17.

Referring to FIGS. 14 to 17, there is shown a flywheel 101 having a recess 114 of a reduced diameter formed therein into which a boss 115 is fitted and secured in place. The boss 115 has a stepped central bore 118 for rotatably receiving a capstan shaft 102 which fixedly carries a gear 102a. The gear 102a meshes with a gear 110a which is rotatably mounted on the lower surface of the flywheel 101 by means of pin 110 and which is in turn in meshing engagement with another gear 127, which is fixedly mounted on a shaft 128. The shaft 128 extends through an axial bore 119 formed through the flywheel 101 from the lower surface thereof to a rib 113 thereon, with a gear 129 fixedly mounted on the other end of the shaft 128.

Figure 14:
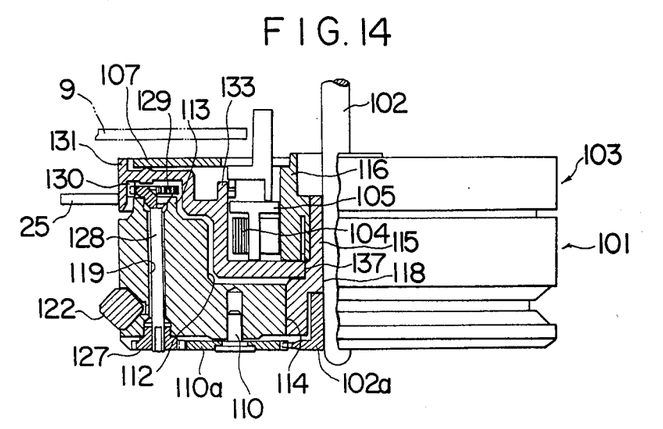
FIG. 14 is a front view, partly in section, of a further embodiment of the invention.
Figure 16:
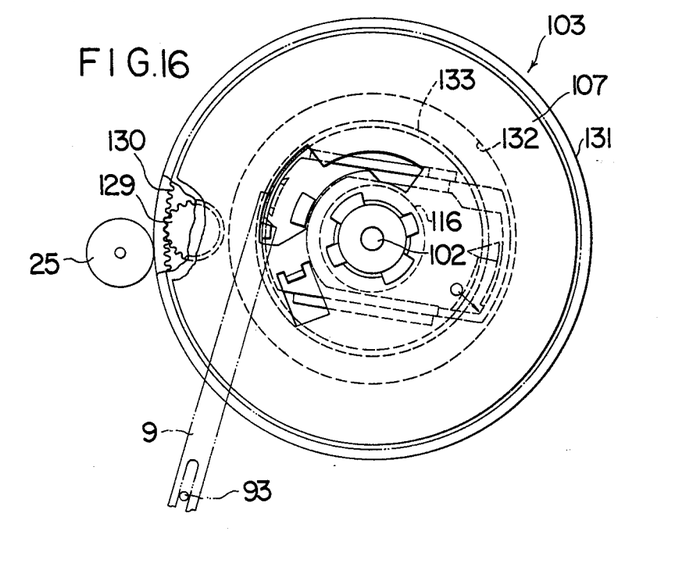
FIG. 16 is a plan view of the embodiment shown in FIG. 14.
Figure 17:
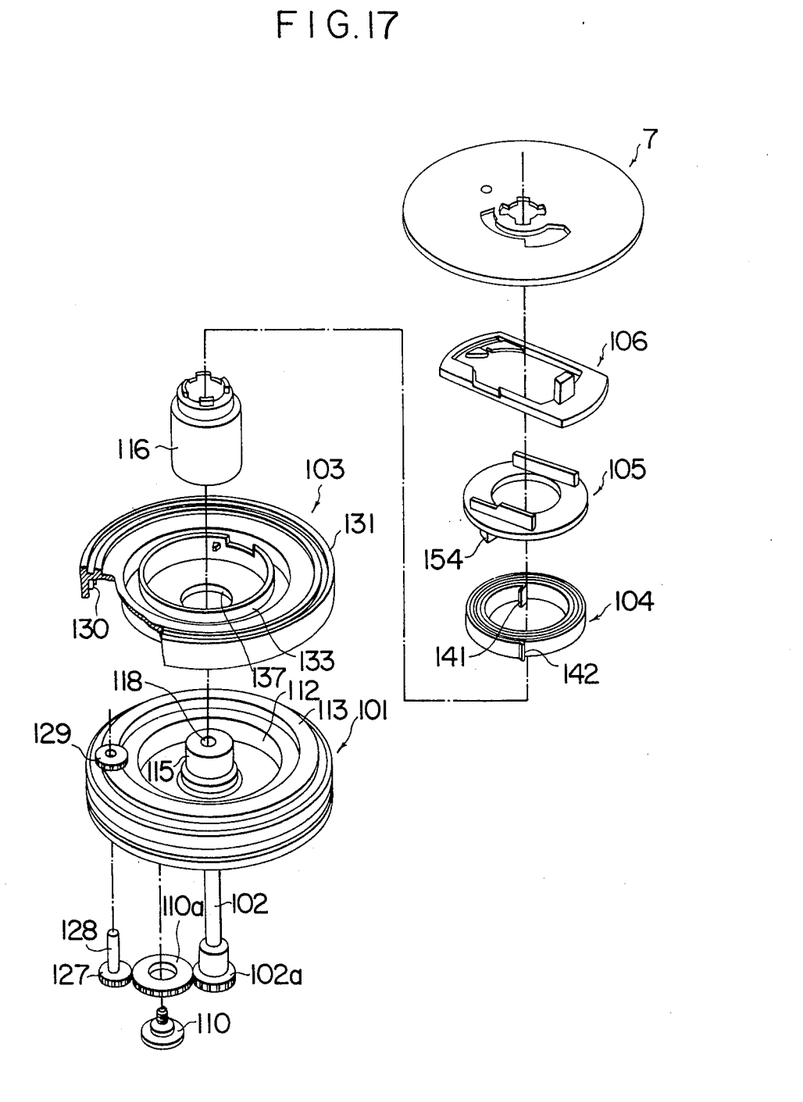
FIG. 17 is an exploded perspective view of the embodiment shown in FIG. 14.

The flywheel 101 is also formed with another recess 112 of a greater diameter which receives a detection wheel 103. The detection wheel 103 is constructed in a similar manner as the detection wheel 3 described previously in connection with the preceding embodiments, except that it is formed with an internal gear 130 around the inner periphery of an outer portion 131. The gear 130 meshes with the gear 129.

The detection wheel 103 is formed with a through-opening 137, into which is fitted a sleeve 116 and is secured over the boss 115 of the flywheel. A spring 104 is disposed between the inner wheel portion 133 of the detection wheel 103 and the sleeve 116, and a slide control member 105 over the spring 104. The spring 104 has its one end anchored to the sleeve 116 on the flywheel 101 and its other end 142 anchored to projection 154 of the control member 105. It is to be understood that the control member 105 is constructed in the similar manner as the slide control member 5 mentioned previously in connection with the previous embodiments except that it is formed with the projection 154. A displacement member 106 is placed on top of the control member 105, and a base plate 107 is placed thereover. The displacement member 106 and the base plate 107 are constructed and assembled in the similar manner as in the previous embodiments. It will be understood that in this embodiment, the rotating torque of the detection wheel 103 is again transmitted through the idler 25 to either one of the reel mounts 24 as shown in FIG. 1 to achieve a rapid tape advance or a tape rewind, and that one of the reel mounts is driven for rotation by a separate drive system during a record/playback mode.

Figure 15:
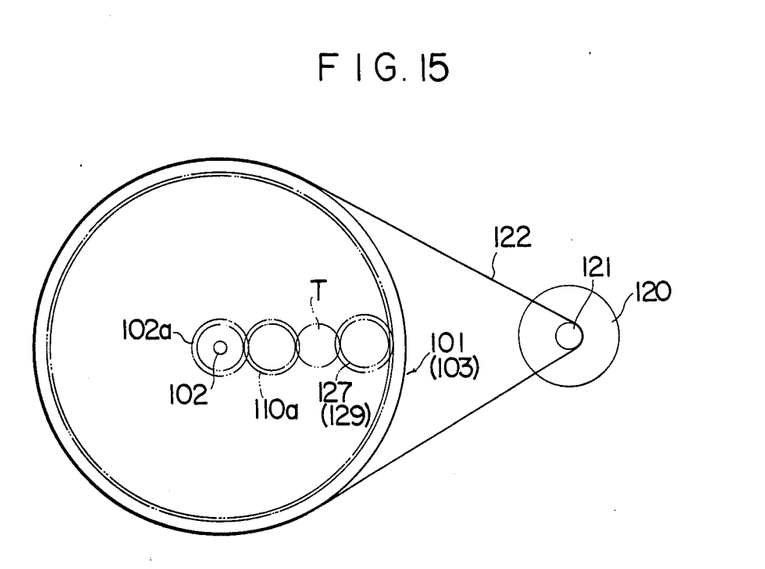
FIG. 15 is a plan view illustrating the principle of operation of the embodiment shown in FIG. 14.

In operation, a drive chain for the capstan shaft 102 of this embodiment is illustrated in FIG. 15. Specifically, the rotating torque from a motor 120 is transmitted through pulley 121, belt 122, flywheel 101, gear 127, torque detecting means T, gear 110a, and gear 102a to the capstan shaft 102. The torque detecting means T comprises a transmission train which includes the flywheel 101, spring 104, slide control member 105, displacement member 106 and detection wheel 103.

Assuming that the tape recorder is in a record/playback mode, torque detected by the torque detecting means T will be greater than the tape feeding torque produced by the cooperation of the capstan shaft 102 and a pinch roller, not shown, since the spring 104 is previously charged. As a consequence, the torque detecting means T will not rotate as will the gears 127, 110a and 102a. Consequently, the capstan shaft 102 can be considered as an integral unit with the fly-wheel 101, rotating integral therewith to feed the tape at a uniform rate. As it is fed, the tape is taken up on the reel which is rotatably driven by the reel mount.

When the tape is completely taken up, the tape feeding operation will be interrupted with the tape being held tensioned. As the tape ceases to be fed, the frictional resistance acting between the capstan shaft 102 and the tape which is urged thereagainst by the pinch roller will increase, whereby the capstan shaft 102 ceases to rotate as does the gear 102a which is integral therewith. However, the flywheel continues to rotate, but the gear 110a tends to rotate, functioning as an epicyclic gear with respect to the gear 102a. However, the presence of the torque means T represents a mechanical resistance which presents a resistance to the rotation of the gear 127, and thus the detection wheel 103 contained in the torque detecting means will experience a similar resistance for its rotation. As a consequence, the flywheel 101 will rotate relative to the detection wheel 103, whereupon the various members operate quite in the similar manner as in the previous embodiments as has been described in connection with FIGS. 5 to 12, automatically resetting a record/playback mode.

During a rapid tape advance or a tape rewind mode, the rotating torque from the detection wheel 103 is transmitted through the idler 25 to either one of the reel mounts 24, so that a greater torque is applied to the torque detecting means T than during a record/playback mode to produce an integral rotation of the torque detecting means T, and hence the detection wheel 103 contained therein, with the flywheel 101, transmitting the torque to the reel mount 24 to take up the tape on the reel at a higher rate. The increased torque detected by the torque detecting means T tensions the spring 104 and causes the various members to assume the similar position as illustrated in FIG. 6.

When a tape end is reached during the winding operation, the reel mount 24 ceases to rotate as does the detection wheel 103. However, the flywheel 101 continues to rotate, whereby the various members operate in the similar manner as in the previous embodiments described in connection with FIGS. 5 to 12, automatically unlocking the rapid tape advance or tape rewind mode.

It will be understood by those skilled in the art that the present invention finds a general application in any instrument utilizing a tape of a film, for example, as a cine camera with concurrent sound recording or movie projector.

1. An automatic stopping device for tape recorder comprising a flywheel, a detection wheel disposed in overlying relationship with the flywheel and disposed for engagement with a tape feed member such as a reel mount or an idler connected therewith, a spring, a slide control member having a sliding wall and urged for rotation in one direction by said spring which has its one end connected with the flywheel, an operation release lever, a displacement member didposed for movement along the sliding wall of the control member and carrying a pin which bears against said operation release lever and also carrying a guide, and a base plate including a guide slot formed therein for receiving the pin to control the extent of movement of the displacement member and also including a guide pin located adjacent the guide of the displacement member for controlling the movement of the displacement member in the radial direction, the arrangement being such that when the tape feed member ceases to move to produce a load which causes the detection wheel to be angularly displaced with respect to the flywheel, the pin on the displacement member is driven in the radial direction onto a path of rotation of a greater diameter along which it is capable of engaging the release lever, thus actuating the release lever.

2. An automatic stopping device according to claim 1 in which the pin on the displacement member is adapted to move in a single plane.

3. An automatic stopping device according to claim 1 in which the flywheel is provided with a capstan shaft which is rotatable relative thereto for feeding the tape at uniform rate, and further including a torque detecting member disposed between the capstan shaft and the detection wheel for detecting a torque applied to the tape take-up member.

* * * * *